United States Patent
Hu

(10) Patent No.: US 12,064,691 B2
(45) Date of Patent: Aug. 20, 2024

(54) GAME SCENE PROCESSING METHOD, APPARATUS, STORAGE MEDIUM, AND ELECTRONIC DEVICE

(71) Applicant: NETEASE (HANGZHOU) NETWORK CO., LTD., Zhejiang (CN)

(72) Inventor: Shihan Hu, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 223 days.

(21) Appl. No.: 17/811,368

(22) Filed: Jul. 8, 2022

(65) Prior Publication Data
US 2022/0379210 A1    Dec. 1, 2022

Related U.S. Application Data

(63) Continuation of application No. PCT/CN2021/132547, filed on Nov. 23, 2021.

(30) Foreign Application Priority Data

May 25, 2021   (CN) .......................... 202110574194.6

(51) Int. Cl.
  *A63F 13/5252*   (2014.01)
  *A63F 13/426*   (2014.01)
  (Continued)

(52) U.S. Cl.
  CPC ........ *A63F 13/5252* (2014.09); *A63F 13/426* (2014.09); *A63F 13/533* (2014.09); *A63F 13/56* (2014.09)

(58) Field of Classification Search
  CPC .... A63F 13/5252; A63F 13/533; A63F 13/56; A63F 13/426
  See application file for complete search history.

(56) References Cited

U.S. PATENT DOCUMENTS

| | | |
|---|---|---|
| 2001/0036852 A1 | 11/2001 | Shigeno |
| 2004/0017473 A1 | 1/2004 | Marks |
| | (Continued) | |

FOREIGN PATENT DOCUMENTS

| | | |
|---|---|---|
| CN | 108415656 A | 8/2018 |
| CN | 110193195 A | 9/2019 |
| | (Continued) | |

OTHER PUBLICATIONS

Camera operation, B-OSP EVEONLINE WIKI [online], May 20, 2017, [Jun. 20, 2023search].
(Continued)

*Primary Examiner* — Werner G Garner
(74) *Attorney, Agent, or Firm* — Qinghong Xu

(57) ABSTRACT

The present disclosure relates to a method, apparatus, storage medium and electronic device for processing a game scene. The method includes: in response to a target control being associated with a first function and a first operation being performed on the target control, acquiring a first coordinate of a first virtual game scene displayed by the game scene screen; determining whether a first distance between the first and second coordinates is greater than a first threshold; in response to the first distance being greater than the first threshold, switching the first virtual game scene displayed by the game scene screen to a second virtual game scene; controlling the target control to switch from the first function to the second function; and in response to a second operation being performed on the target control, switching the second virtual game scene back to the first virtual game scene.

20 Claims, 3 Drawing Sheets

(51) Int. Cl.
*A63F 13/533* (2014.01)
*A63F 13/56* (2014.01)

(56) References Cited

U.S. PATENT DOCUMENTS

| | | |
|---|---|---|
| 2005/0187015 A1 | 8/2005 | Suzuki et al. |
| 2006/0258444 A1 | 11/2006 | Nogami et al. |
| 2018/0028918 A1* | 2/2018 | Tang .................... G06F 3/0484 |

FOREIGN PATENT DOCUMENTS

| | | |
|---|---|---|
| CN | 110215690 A | 9/2019 |
| CN | 111729306 A | 10/2020 |
| CN | 111773696 A | 10/2020 |
| CN | 112221131 A | 1/2021 |
| CN | 112370781 A | 2/2021 |
| CN | 112619135 A | 4/2021 |
| CN | 112619162 A | 4/2021 |
| CN | 113318447 A | 8/2021 |
| JP | 2004313778 A | 11/2004 |
| JP | 2005230263 A | 9/2005 |
| JP | 2006305176 A | 11/2006 |
| JP | 2015029901 A | 2/2015 |
| JP | 2018086275 A | 6/2018 |

OTHER PUBLICATIONS

Selected item window, B-OSP EVEONLINE WIKI [online], Nov. 29, 2015, [Jun. 20, 2023 search].
Notice of Allowance dated Nov. 28, 2023 of Japanese Application No. 2022-085334.
International Search Report dated Feb. 24, 2022 for PCT International Application No. PCT/CN2021/132547.
First Office Action dated Mar. 7, 2022 of Chinese Patent No. 202110574194.6.
Notice of Allowance dated Dec. 12, 2023 for Japanese Application No. 2022-570325.

\* cited by examiner

GAME SCENE PROCESSING METHOD, APPARATUS, STORAGE MEDIUM, AND ELECTRONIC DEVICE

The present application is a Continuation Application of the International Patent Application No. PCT/CN2021/132547 filed on Nov. 23, 2021, which claims the priority of the Chinese patent application No. 202110574194.6, filed on May 25, 2021 and titled by "Game Scene Processing Method, Apparatus, Storage Medium and Electronic Device", the entire contents of both are incorporated herein by reference for all purposes.

TECHNICAL FIELD

The present disclosure relates to the technical field of games, and in particular, to a game scene processing method, apparatus, storage medium, and electronic device.

BACKGROUND

In some games, for example, turn-based games, strategy games or simulation games (SLG), map resources play an important role in the game scene, and the game camera is often moved to the game scene other than the target virtual model, such as the main city occupied and controlled by the user, when exploring map resources, and the main city is quickly returned by clicking the position control when needed. In the related art, a way is provided to record the current target location by clicking the record control before the main city is returned, and then the target location is returned according to the recorded location information after completing the city returning operation.

SUMMARY

Embodiments of the present disclosure provide a game scene processing method, apparatus, storage medium, and electronic device, to at least solve the technical problem in the related art that switching between different virtual game scenes based on location positioning may not be achieved.

According to an aspect of embodiments of the present disclosure, a method for processing a game scene is provided. A graphical user interface is rendered by a display component of a terminal. The graphical user interface includes a target control and a game scene screen displaying at least part of a virtual game scene. The target control is associated with a first function or a second function.

The method includes steps of: in response to the target control being associated with the first function and a first operation being performed on the target control, acquiring a first coordinate of a first virtual game scene displayed by the game scene screen; determining whether a first distance between the first coordinate and a second coordinate is greater than a first threshold, where the second coordinate is a coordinate of a target virtual model in the virtual game scene; in response to the first distance being greater than the first threshold, switching the first virtual game scene displayed by the game scene screen to a second virtual game scene, where the second virtual game scene is a virtual game scene where the second coordinate is located; controlling the target control to switch from the first function to the second function; and after controlling the target control to switch from the first function to the second function, and in response to a second operation being performed on the target control, switching the second virtual game scene back to the first virtual game scene.

In an exemplary embodiment of the present disclosure, after switching the second virtual game scene back to the first virtual game scene, the method includes: controlling the target control to switch from the second function back to the first function.

In an exemplary embodiment of the present disclosure, in response to the first distance being greater than the first threshold, switching the first virtual game scene displayed by the game scene screen to the second virtual game scene, includes: in response to the first distance being greater than the first threshold, switching the first virtual game scene displayed by the game scene screen to the second virtual game scene, and recording the first coordinate.

In an exemplary embodiment of the present disclosure, the method includes: in response to the first distance being less than or equal to the first threshold, switching the first virtual game scene displayed by the game scene screen to the second virtual game scene; and keeping the target control being associated with the first function.

In an exemplary embodiment of the present disclosure, in response to the second operation being performed on the target control, switching the second virtual game scene back to the first virtual game scene, includes: in response to the second operation being performed on the target control, controlling a virtual game character to find a path to the first coordinate along a designated route, so that the second virtual game scene is switched back to the first virtual game scene. In an exemplary embodiment of the present disclosure, acquiring the first coordinate of the first virtual game scene displayed by the game scene screen, includes: acquiring a center position point in the first virtual game scene, and determining the first coordinate based on the center position point; or acquiring a current position point in the first virtual game scene, and determining the first coordinate based on the current position point.

In an exemplary embodiment of the present disclosure, after switching the first virtual game scene to the second virtual game scene, the method further includes: in response to a third operation for scene switching, switching the second virtual game scene to a third virtual game scene.

In an exemplary embodiment of the present disclosure, after switching the second virtual game scene to the third virtual game scene, the method further includes: acquiring a third coordinate in the third virtual game scene; determining whether a second distance between the third coordinate and the second coordinate is greater than a second threshold; and in response to the second distance being greater than the second threshold, controlling the target control to switch from the second function back to the first function.

In an exemplary embodiment of the present disclosure, the third coordinate is the current position point of a virtual game character in the third virtual game scene, the center coordinate in the third virtual game scene, or another fixed position point in the third virtual game scene.

In an exemplary embodiment of the present disclosure, the method includes: in response to the second distance being less than or equal to the second threshold, keeping the target control being associated with the second function.

In an exemplary embodiment of the present disclosure, the target control is arranged at a predetermined position of the game scene screen. The predetermined position is further provided with at least one of a thumbnail map, a search control, and a mark control. The thumbnail map is at least used to display coordinates in the virtual game scene.

In an exemplary embodiment of the present disclosure, when the target control is associated with the first function, the icon displayed by the target control is an icon corresponding to the first function; and when the target control is associated with the second function, the icon displayed by the target control is an icon corresponding to the second function.

According to another aspect of embodiments of the present disclosure, an apparatus for processing a game scene is further provided. A graphical user interface is rendered by a display component of a terminal. The graphical user interface includes a target control and a game scene scene displaying at least part of a virtual game scene. The target control is associated with a first function or a second function.

The apparatus includes:

an execution module, configured to acquire a first coordinate of a first virtual game scene displayed by the game scene screen, in response to the target control being associated with the first function and a first operation being performed on the target control;

a first determination module, configured to determine whether the first distance between the first coordinate and a second coordinate is greater than a first threshold, where the second coordinate is a coordinate of a target virtual model in the virtual game scene;

a first switching module, configured to switch the first virtual game scene displayed by the game scene screen to a second virtual game scene when the first distance is greater than the first threshold, where the second virtual game scene is the virtual game scene where the second coordinate is located; and a processing module, configured to control the target control to switch from the first function to the second function, and to switch the second virtual game scene back to the first virtual game scene in response to a second operation being performed on the target control after controlling the target control to switch from the first function to the second function.

According to another aspect of embodiments of the present disclosure, a non-volatile storage medium is further provided. The non-volatile storage medium is configured to store a program therein. When the program is in operation, a device where the non-volatile storage medium is located is controlled to perform the method for processing a game scene in any one of the above-mentioned embodiments.

According to another aspect of embodiments of the present disclosure, there is also provided an electronic device, including a memory and a processor. The memory is configured to store a computer program. The processor is configured to run the computer program to perform the method for processing a game scene in any one of the above embodiments.

BRIEF DESCRIPTION OF THE DRAWINGS

The accompanying drawings described herein are used to provide a further understanding of the present disclosure and constitute a part of the present disclosure. The exemplary embodiments of the present disclosure and their descriptions are used to explain the present disclosure and do not constitute an improper limitation of the present disclosure. In the attached drawings.

DETAILED DESCRIPTION OF THE EMBODIMENTS

Figure 1:
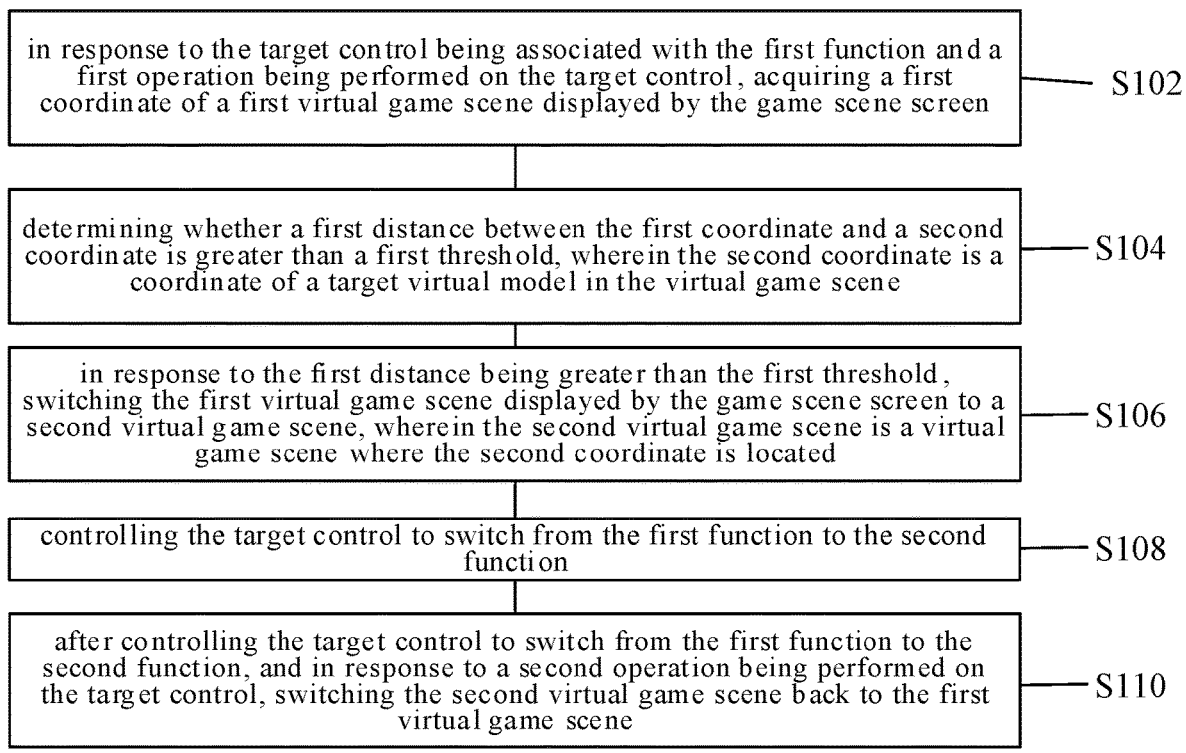
FIG. 1 is a flowchart of a method for processing a game scene according to an embodiment of the present disclosure.

In order to make those skilled in the art better understand solutions of the present disclosure, the technical solutions in embodiments of the present disclosure will be clearly and completely described below with reference to the accompanying drawings in embodiments of the present disclosure. Obviously, the described embodiments are only part of embodiments of the present disclosure, but not all of the embodiments. Based on the described embodiments in the present disclosure, all other embodiments obtained by those of ordinary skill in the art without creative efforts shall fall within the protection scope of the present disclosure.

It should be noted that the terms "first", "second" and the like in the description and claims of the present disclosure and the above drawings are used to distinguish similar objects, and are not necessarily used to describe a specific sequence or sequence. It is to be understood that the data so used may be interchanged under appropriate circumstances, such that embodiments of the present disclosure described herein may be practiced in sequences other than those illustrated or described herein. Furthermore, the terms "comprising", "having", and any variations thereof are intended to cover non-exclusive inclusion. For example, a process, method, system, product or device comprising a series of steps or units is not necessarily limited to those expressly listed steps or units. Rather, it may include other steps or units not expressly listed or inherent to the process, method, product or device.

The above-mentioned related technologies have the following defects. Firstly, if the user forgets to record the target location, there will be a fault in the city returning operation. The user needs to spend a lot of time searching for the target location or even can no longer find the target location. The operation at the target location is thus invalid. Secondly, the record control is only used to record the location information of the target location. For the target location far away from the main city, after the city returning operation, the user still need to search for the target location by sliding over the screen or moving the mouse if it is required to return to the target location from the main city. Such operation is cumbersome. Thirdly, it is necessary to set the record control and the position control at the same time, which is easy to block the game field of view for the user. For the above problems, no effective solution has been proposed yet.

According to an embodiment of the present disclosure, a method for processing a game scene is provided. It should be noted that steps shown in the flowcharts of the accompanying drawings may be executed in a computer system having such as a set of computer-executable instructions. Although a logical order is shown in the flowcharts, in some cases, steps shown or described may be performed in an order different from that described herein.

The technical solutions of the method embodiments may be executed in a mobile terminal, a computer terminal or a similar computing device. Taking operation on a mobile terminal as an example, the mobile terminal may be a smart phone (such as an Android mobile phone, an iOS mobile phone, etc.), a tablet computer, a handheld computer, a mobile Internet device (referred to as MID), PAD and other terminal devices. The mobile terminal may include one or more processors and a and memory for storing data. The processors may include, but are not limited to, a central processing unit (CPU), a graphics processing unit (GPU), a digital signal processing (DSP) chip, a microprocessor (MCU), a programmable logic device (such as FPGA), a neural network processor (NPU), a tensor processor (TPU), an artificial intelligence (AI) type processor, etc. Optionally, the above-mentioned mobile terminal may further include a transmission device for communication functions, an input and output device, and a display device. Those of ordinary skill in the art may understand that the foregoing structural description is only for illustration, and does not limit the structure of the foregoing mobile terminal. For example, the mobile terminal may further include more or less components than those described above, or have different configurations than those described above.

The memory may be used to store computer programs, for example, software programs and modules of application software, such as computer programs corresponding to the method for processing a game scene in embodiments of the present disclosure. By executing the computer programs stored in the memory, the processor performs various function applications and data processing, namely achieving the above-mentioned method for processing a game scene. The memory may include high-speed random access memory, and may also include non-volatile memory, such as one or more magnetic storage devices, flash memory, or another non-volatile solid-state memory. In some instances, the memory may further include a memory located remotely relative to the processor. The remote memory may be connected to the mobile terminal through a network. Examples of such networks include, but are not limited to, the Internet, an intranet, a local area network, a mobile communication network, and combinations thereof.

The transmission device is used to receive or send data via a network. The specific example of the above-mentioned network may include a wireless network provided by a communication provider of the mobile terminal. In an example, the transmission device includes a network adapter or network interface controller (NIC for short), which may be connected to other network devices through a base station so as to communicate with the Internet. In an example, the transmission device may be a radio frequency (RF for short) module, which is used to communicate with the Internet in a wireless way. The technical solutions of the method embodiments may be applied to various communication systems, such as Global System of Mobile communication (GSM for short) system, Code Division Multiple Access (CDMA for short) system, Wideband Code Division Multiple Access (WCDMA for short) system, General Packet Radio Service (GPRS for short), Long Term Evolution (LTE for short) system, LTE Frequency Division Duplex (FDD) system, LTE Time Division Duplex (TDD) system, Universal Mobile Telecommunication System (UMTS), Worldwide Interoperability for Microwave Access (referred to as WiMAX) communication system or 5G system, etc. Optionally, Device-to-Device (D2D for short) communication may be performed among multiple mobile terminals. Optionally, 5G system or 5G network is also referred to as a New Radio (NR for short) system or NR network. The display device may be, for example, a liquid crystal display (LCD) of the touch screen type and a touch display (also referred to as a "touch screen" or "touch display"). The liquid crystal display may enable the user to interact with the user interface of the mobile terminal. In some embodiments, the above-mentioned mobile terminal has a graphical user interface (GUI), and the user may perform human-computer interaction with GUI by touching finger contacts and/or gestures on the touch-sensitive surface. The human-computer interaction function is optional, including interactions such as creating web pages, drawing, word processing, making electronic documents, gaming, video conferencing, instant messaging, sending and receiving emails, calling interfaces, playing digital video, playing digital music and/or web browsing, etc. Executable instructions for performing the above-mentioned human-computer interaction functions are configured/stored in one or more processor-executable computer program products or readable non-volatile storage media.

FIG. 1 is a flowchart of a method for processing a game scene according to an embodiment of the present disclosure. As shown in FIG. 1, the method includes the following steps: S102, S104, S106, S108, and S110.

In step S102, when the target control is associated with the first function, in response to the first operation being performed on the target control, the first coordinate of the first virtual game scene displayed by the game scene screen is acquired.

In step S104, it is determined whether the first distance between the above-mentioned first coordinate and the second coordinate is greater than a first threshold. The above-mentioned second coordinate is the coordinate of the target virtual model in the above-mentioned virtual game scene.

In step S106, when the first distance is greater than the first threshold, the first virtual game scene displayed by the game scene screen is switched to a second virtual game scene. The second virtual game scene is a virtual game scene where the second coordinate is located.

In step S108, the above-mentioned target control is controlled to switch from the first function to the second function.

In step S110, after controlling the target control to switch from the first function to the second function, and in response to the second operation being performed on the target control, the second virtual game scene is switched back to the first virtual game scene.

It should be noted that, in the method for processing a game scene provided by an embodiment of the present disclosure, a graphical user interface is rendered by a display component of a terminal, and the above-mentioned graphical user interface includes a target control and a game scene screen displaying at least part of the virtual game scene. The above target control is associated with a first function or a second function.

A virtual game scene is a virtual scene displayed (or provided) when an application runs on a terminal or server. Optionally, the virtual game scene is a simulated environment of the real world, or a semi-simulated and semi-fictional virtual environment, or a purely fictional virtual environment. The virtual game scene is any one of a two-dimensional virtual game scene and a three-dimensional virtual game scene. The virtual environment may be sky, land, ocean, etc. The land includes environmental elements such as deserts and cities. The virtual game scene is a scene in which virtual objects such as user control complete game logics.

In step S102, when the target control is associated with the first function, the first coordinate of the first virtual game scene displayed by the game scene screen is acquired in response to the first operation being performed on the target control.

Optionally, the above-mentioned first operation may be a touch operation in a mobile game, or may be a mouse click operation in a client game, which is not specifically limited in the present application. The above-mentioned first function may be the function for switching between game scene screens in the game, for example, switching to a screen where a specified coordinate is located. The specified coordinate may be the coordinate of the virtual building occupied by the user, or the coordinate of a specified Non-Player Character (NPC).

Figure 2:
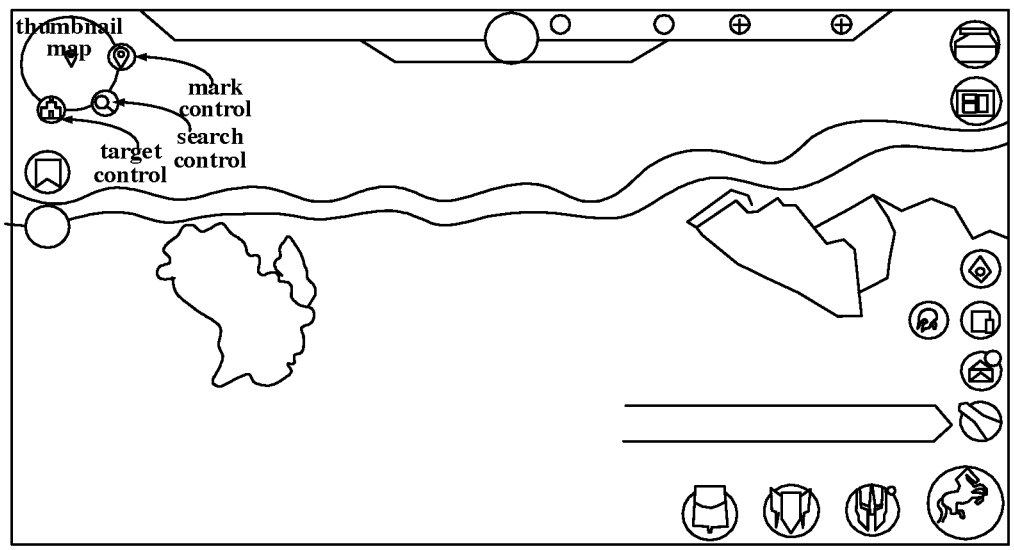
FIG. 2 is a schematic diagram of a game scene screen according to an embodiment of the present disclosure.
Figure 3:
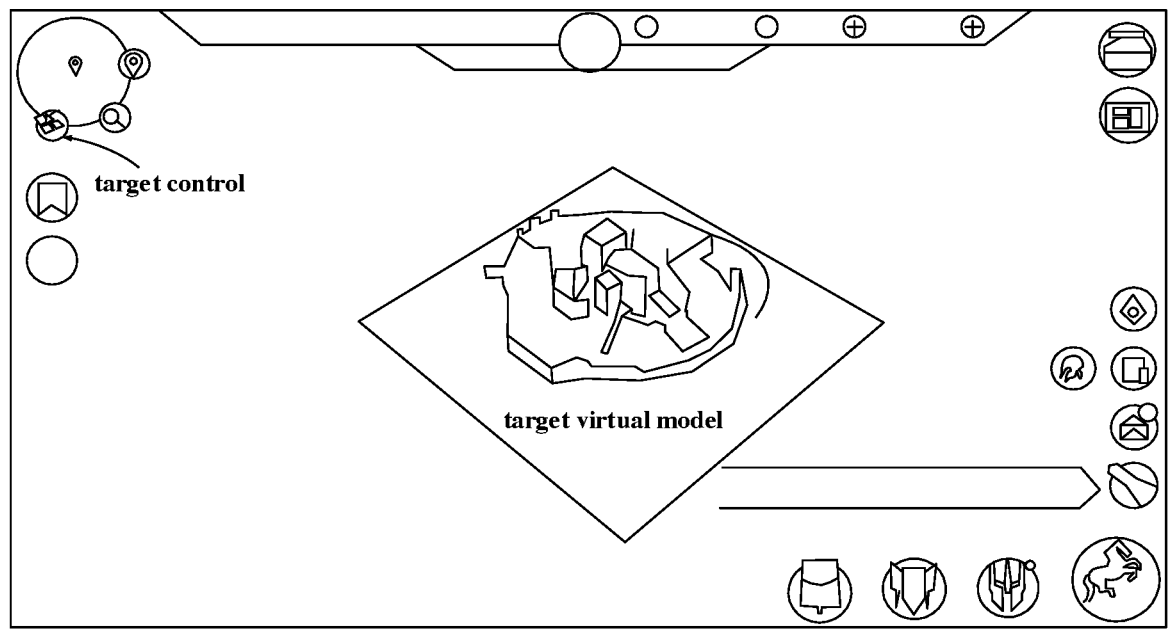
FIG. 3 is a schematic diagram of a game scene screen according to an embodiment of the present disclosure.

Optionally, in one of embodiments of the present disclosure, the first virtual game scene displayed in the above-mentioned game scene screen may be a virtual game scene different from the second virtual game scene. For example, the first virtual game scene may be a virtual game scene not including the target virtual model or a virtual game scene including only a part of the target virtual model. Alternatively, the first virtual game scene may be a virtual game scene that includes the entire target virtual model but the target virtual model is not located at the center point of the game scene screen. In an optional embodiment, the first virtual game scene may be, but is not limited to, as shown in FIG. 2. The above-mentioned target control may be arranged at a predetermined position of the game scene screen as shown in FIG. 2. When the target control is associated with the first function, the icon displayed by the target control is the icon corresponding to the first function, and the style of the icon may be as shown in FIG. 2. But, the style of the icon is not specifically limited in the present application. The second virtual game scene displayed in the above-mentioned game scene screen may be, but not limited to, as shown in FIG. 3. When the target control is associated with the second function, the icon displayed by the target control is the icon corresponding to the second function, and the style of the icon may be as shown in FIG. 3. But the present application does not specifically limit the style of the icon. In an optional embodiment, still as shown in FIG. 2, the above-mentioned predetermined position is further provided with at least one of the following: a thumbnail map, a search control, and a mark control. The above-mentioned thumbnail map is at least used to display coordinates in the virtual game scene. Users may search for various virtual game resources in the above virtual game scene by clicking or touching the search control. The virtual game resources may be such as virtual wood, virtual stone, virtual iron ore, virtual grain and grass, virtual wandering troops, etc. The user clicks or touches one or more virtual game resources in the virtual game scene, such as one or more pieces of virtual land, virtual wood, virtual stone, virtual iron ore, virtual building, etc. After clicking a virtual game resource, the selected virtual game resource may be specially marked by clicking or touching the marker control, and the marked virtual game resource is displayed in the marker list, so that users may open the marker list to view the currently marked virtual game assets.

In an optional embodiment, when the target control is associated with the first function, and the user clicks or touches the target control to perform a first operation on the target control, the server responds to the first operation performed by the user on the target control, and acquires the first coordinate of the first virtual game scene displayed by the above-mentioned game scene screen. Optionally, the first coordinate may be the center position point in the first virtual game scene, or the current location point of the virtual game character controlled by the user in the first virtual game scene. Alternatively, it may also be another location point selected by the user. In step S104, it is determined whether the first distance between the first coordinate and the second coordinate is greater than a first threshold. The second coordinate is the coordinate of the target virtual model in the virtual game scene. Specifically, the second coordinate is the coordinate of the target virtual model in the above-mentioned virtual game scene. The above-mentioned target virtual model may be a virtual model operable by the user in the game, such as a main city, a designated NPC, other virtual building model, and so on. For example, the target virtual model may be the main city as shown in FIG. 3.

A virtual game character is a dynamic object that may be controlled in a virtual game scene. Optionally, the dynamic object may be a virtual character, a virtual animal, an animation character, or the like. The virtual game character is a character controlled by the user through an input device. Alternatively, the virtual game character may be an artificial intelligence (AI) set by training in the virtual environment battle, or a Non-Player Character (NPC) set in the virtual game scene battle.

As an optional embodiment, taking SLG games as an example, users often move the game camera to the first virtual game scene outside the target virtual model (such as the main city) when exploring map resources. When the user needs to return from the first coordinate of the first virtual game scene to the second coordinate of the main city in the second virtual game scene, the virtual game character (for example, a user-controlled character such as knight, hero) may be controlled by clicking or touching the target control, so as to quickly switch the game camera from the first virtual game scene where the first coordinate is located to the second virtual game scene where the main city is located. The user may control the virtual game character to change or supplement virtual game resources in the main city, such as recruiting troops, adding troops, updating weapons, etc. After completing the city returning operation, the target control may be clicked or touched so as to return to the first coordinate according to the recorded location information of the first coordinate. That is, the second virtual game scene is switched again to the first virtual game scene again, without needing to search for the path to the first coordinate aimlessly by sliding over the screen.

In step S106, when the first distance is greater than the first threshold, the first virtual game scene displayed by the game scene screen is switched to a second virtual game scene. The second virtual game scene is the virtual game scene where the second coordinate is located.

In the above-mentioned optional embodiment, the second virtual game scene may be a virtual game scene included in the game scene screen obtained by shooting the target virtual model with the virtual camera. For example, the target virtual model is used as the focus point for shooting, and the center point of the second virtual game scene is the target virtual model. After acquiring the first coordinate, it is determined whether the first distance between the first coordinate and the second coordinate is greater than the first threshold. When the first distance is greater than the first threshold, the first virtual game scene displayed by the game scene screen is switched to the second virtual game scene. As an example, the above-mentioned first coordinate is the center position point in the first virtual game scene, the second coordinate is the position point of the target virtual model in the second virtual game scene, and the first threshold is the length of 5 grids in the game scene screen, where the game scene screen contains multiple grids, and the size of each grid is fixed and equal. That is, the length of each grid is equal. For example, if the first threshold is equal to the length of 5 grids in the game scene screen, accordingly the target virtual model may occupy 9 grids in the game scene screen. When the first distance between the center position point and the position point of the main city is greater than the first threshold, then the first virtual game scene displayed by the above-mentioned game scene screen is switched to the second virtual game scene, the position of the main city in the second virtual scene is returned to, and the above-mentioned target control is controlled to switch from the first function to the second function. When the target control is associated with the second function, the user performs a second operation on the target control, performs the second function in response to the second operation, and controls the virtual game scene displayed by the game scene screen to switch from the second virtual game scene to the first virtual game scene.

In an optional embodiment, when the first distance is greater than the first threshold, the first virtual game scene displayed by the game scene screen is switched to the second virtual game scene, and the first coordinate is recorded. Specifically, when the first distance between the first coordinate and the second coordinate is greater than the first threshold, it means that the first coordinate is far away from the second coordinate to be visited at this time, and the server or terminal may automatically record the first coordinate in the first virtual game scene.

In step S108, the above-mentioned target control is controlled to switch from the first function to the second function.

Specifically, when the first distance is greater than the first threshold, the first virtual scene displayed by the game scene screen is switched to the second virtual scene, and the switching of the above-mentioned scene causes the target control to switch from the first function to the second function. Thus, after switching from the first virtual game scene to the second virtual game scene, the target control may be associated with the function of returning to the first virtual game scene corresponding to the first coordinate, which is convenient for the user to return to the first virtual game scene.

Through an embodiment of the present disclosure, since the user performs the first operation on the target control when the target control is associated with the first function (that is, going to the second virtual game scene corresponding to the second coordinate, such as going to the main city), in response to the first operation and the first distance between the first coordinate and the second coordinate being determined to be greater than the first threshold, the first coordinate is automatically recorded without the need for the user to manually record it. After the first operation is performed, the control target is controlled to switch from the first function to the second function. It is only necessary to perform the second operation on the target control when the target control is associated with the second function, then the first virtual game scene corresponding to the first coordinate may be returned. Thus, the user does not need to spend a lot of time searching for the first virtual game scene corresponding to the first coordinate, and the returned first virtual game scene will retain the user's previous related game operations. That is, the user's previous operations in the first virtual game scene corresponding to the first coordinate are all valid.

In an embodiment of the present disclosure, the method for enriching the setting functions of the target control is adopted. When the target control is associated with the first function, the first coordinate of the first virtual game scene displayed by the game scene screen is acquired in response to the first operation being performed on the target control. It is further determined whether the first distance between the first coordinate and the second coordinate is greater than the first threshold. The second coordinate is the coordinate of the target virtual model in the virtual game scene. When the first distance is greater than the first threshold, the first virtual game scene displayed by the game scene screen is switched to a second virtual game scene. The second virtual game scene is the virtual game scene where the second coordinate is located. Also, the target control is controlled to switch from the first function to the second function. After controlling the target control to switch from the first function to the second function, and in response to a second operation being performed on the target control, the second virtual game scene is switched back to the first virtual game scene, achieving the purpose of switching among different virtual game scenes based on location positioning, thereby reducing the tedious operation of switching from the second virtual game scene back to the first virtual game scene, and improving the processing efficiency when the user switches among the virtual game scenes. Further, the technical problem in the related art is solved that it is impossible to switch among different virtual game scenes based on location positioning.

In an optional embodiment, the method includes: in response to the first distance being less than or equal to the first threshold, switching the first virtual game scene displayed by the game scene screen to the second virtual game scene; and keeping the target control being associated with the first function.

Specifically, when the first distance between the first coordinate and the second coordinate is greater than the first threshold, it means that the first coordinate is closer to the second coordinate to be visited at this time, and the user simply slides over the screen so as to move to the first virtual game scene corresponding to the first coordinate. So it is not necessary to record the first coordinate in the first virtual scene. In step S110, after controlling the target control to switch from the first function to the second function, the second virtual game scene is switched back to the first virtual game scene in response to the second operation being performed on the target control.

Through an embodiment of the present disclosure, after the first function is performed, the target control is controlled to switch from the first function to the second function, and then the second virtual game scene may be switched back to the first virtual game scene by responding to the second operation being performed on the target control. This does not need to simultaneously set or operate the record control and the position control separately, so the setting may provide the user with a broader and clearer field of game view. In an optional embodiment, in response to the second operation being performed on the target control, the second virtual game scene is switched back to the first virtual game scene. This includes: in response to the second operation being performed on the target control, the virtual game character is controlled to find a path to the first coordinate along the designated route, so as to complete the switch from the second virtual game scene back to the first virtual game scene.

As shown in FIG. 3, the target control is in the state of the second function, and the icon displayed by the target control is the icon corresponding to the second function. In response to the second operation of the current touch or mouse click on the target control, the virtual game character is controlled along the designated route to find a route to the first coordinate, so as to switch from the second virtual game scene to the first virtual game scene.

Through an embodiment of the present disclosure, the virtual game character may be controlled to find a path to the first coordinate along the designated route, so as to complete the switch from the second virtual game scene to the first virtual game scene. That is, in an embodiment of the present disclosure, not only the location information of the first coordinate may be recorded, but also the virtual game scene where the first coordinate is located may be directly recorded. Even for a place far away from the main city, the first coordinate may be returned to by a single keypress, which does not require the user to return by sliding over the screen or moving the mouse according to the first coordinate, rendering the operation method more convenient and efficient.

In an optional embodiment, after switching the second virtual game scene back to the first virtual game scene, the method includes: controlling the target control to switch from the second function back to the first function.

Specifically, after switching the second virtual game scene back to the first virtual game scene, the function associated with the target control is switched from the second function back to the first function, so as to facilitate the user to operate the target control for going to the target virtual model in the game.

As an optional embodiment, the above method further includes: in response to a fourth operation on the target virtual model in the second virtual game scene, controlling the target virtual model to perform a corresponding virtual action, for example, changing or supplementing virtual game resources, that is, supplementing arms, weapons, etc.

In an optional embodiment, acquiring the first coordinate of the first virtual game scene displayed by the game scene screen includes: acquiring the center position point in the first virtual game scene, and determining the first coordinate based on the center point; or acquiring the current position point of the virtual game character in the first virtual game scene, and determining the first coordinate based on the current position point.

Optionally, the above-mentioned first coordinate may be obtained by acquiring the center position point in the first virtual game scene, or may be obtained by acquiring the current position point of the virtual game character in the first virtual game scene. It should still be noted that, in the case where the accuracy requirement is not high, the first coordinate may also be obtained by acquiring any fixed position point in the first virtual game scene.

Through the above embodiments of the present disclosure, one or more position points in the first virtual game scene may be determined. When switching from the second virtual game scene back to the first virtual game scene, the first coordinate in the first virtual game scene may be accurately located, so that the virtual game character may return to the first coordinate.

In an optional embodiment, after the first virtual game scene is switched to the second virtual game scene, the method further includes: in response to the third operation for scene switching, the above-mentioned second virtual game scene is switched to a third virtual game scene.

In the above-mentioned optional embodiment, the third operation may be an operation performed by the user by moving the mouse or sliding on the screen, or may be an operation of controlling the movement of the virtual character. The above-mentioned third operation may be used to change the camera position or the viewing angle of the virtual camera, so that the game scene screen captured by the virtual camera changes, and then the second virtual game scene is switched to the third virtual game scene. For example, if the user controls the virtual game character to perform the third operation by clicking the mouse or touching, and moves from the second coordinate in the second virtual game scene to the third coordinate in the second virtual game scene is switched to the third virtual game scene. The third game scene is a virtual game scene where the third coordinate is located. In an optional embodiment, after the second virtual game scene is switched to a third virtual game scene, the method further includes: obtaining the third coordinate in the third virtual game scene; determining whether the second distance between the third coordinate and the second coordinate is greater than a second threshold; and when the second distance is greater than the second threshold, controlling the target control to switch from the second function back to the first function.

As an optional embodiment, after the second virtual game scene is switched to the third virtual game scene, a third coordinate in the third virtual game scene is acquired. The third coordinate may be the current position point of the virtual game character in the third virtual game scene.

It should be noted that the third coordinate may also be a central coordinate in the third virtual game scene, or other fixed position points in the third virtual game scene, which are not specifically limited in the present application.

After the third coordinate is acquired, it may be determined whether the second distance between the third coordinate and the second coordinate is greater than the second threshold. When the second distance is greater than the second threshold, the target control is controlled to switch back from the second function to the first function, and an icon corresponding to the first function is displayed. Then, the first function may be performed when the user's touch or click operation on the target control is detected.

As an example, the third coordinate is the center position point in the third virtual game scene, the second coordinate is the position point of the main city in the second virtual game scene, and the second threshold is the length of 5 grids displayed in the game scene screen. For example, when the user is in the state of the second function of the target control, that is, the user may see the icon corresponding to the second function displayed by the target control, the user controls the virtual game character to move to the third coordinate in the third virtual game scene. When the second distance between the third coordinate and the second coordinate does not exceed 5 grids, the target control is still in the state of the second function, and the icon corresponding to the second function is displayed by the target control. However, if the second distance between the third coordinate and the second coordinate is greater than 5 grids due to any operation, it means that the user does not need or want to return to the first virtual game scene where the first coordinate is located. Then, the recorded first coordinate may be cleared, the target control becomes in the state of the first function, and the target control displays the icon corresponding to the first function. After the target control is clicked or touched again, it may be switched back to the state of the second function, and the third virtual game scene is switched back to the second virtual game scene.

In an optional embodiment, the method includes: in response to the second distance being less than or equal to the second threshold, keeping the target control being associated with the second function.

It should be noted that the first threshold and the second threshold in an embodiment of the present disclosure are not uniquely determined. In the actual applications, the specific values of the first threshold and the second threshold may be predetermined, so as to avoid the cumbersome setting by the user. However, based on the different requirements of different users for the accuracy of coordinate positioning, the user may also set or change the values of the first threshold and the second threshold at any time. Alternatively, based on upadating or change of the virtual game screen scene in the mobile game or the terminal game, values of the first threshold and the second threshold may also be updated adaptively.

Figure 4:
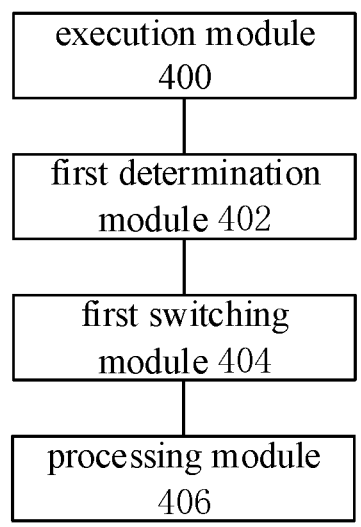
FIG. 4 is a schematic structural diagram of an apparatus for processing a game scene according to an embodiment of the present disclosure.

According to an embodiment of the present disclosure, there is also provided an apparatus for implementing the above-mentioned method for processing a game scene. According to the apparatus for processing a game scene, a graphical user interface is rendered by a display component of a terminal, and the graphical user interface includes a target control and a game scene screen displaying at least part of a virtual game scene. The target control is associated with a first function or a second function. FIG. 4 is a schematic structural diagram of an apparatus for processing a game scene according to an embodiment of the present disclosure. As shown in FIG. 4, the apparatus for processing the game scene includes: an execution module 400, a first determination module 402, a first switching module 404 and a processing module 406.

The execution module 400 is configured to acquire the first coordinate of the first virtual game scene displayed by the game scene screen in response to the target control being associated with the first function and the first operation being performed on the above-mentioned target control. The first determination module 402 is used to determine whether the first distance between the first coordinate and the second coordinate is greater than the first threshold. The second coordinate is the coordinate of the target virtual model in the virtual game scene. The first switching module 404 is configured to switch the first virtual game scene displayed by the above-mentioned game scene screen to a second virtual game scene in response to the first distance being greater than the first threshold. The second virtual scene is the virtual game scene where the second coordinate is located. The processing module 406 is configured to control the target control to switch from the first function to the second function; and after controlling the target control to switch from the first function to the second function, to switch the second virtual game scene back to the first virtual game scene in response to the second operation being performed on the target control.

It should be noted that the above modules may be implemented by software or hardware. For example, the latter may be implemented such that the above modules may be located in the same processor; or, the above modules may be located in different processors in any combination.

It should be noted herein that the execution module 400, the first determination module 402, the first switching module 404 and the processing module 406 correspond to steps S102 to S108 in the method embodiments, and implementation examples and application scenarios of the modules and the corresponding steps are the same, but are not limited to the contents disclosed in the above method embodiments. It should be noted that the above-mentioned modules may be operate in a computer terminal as a part of the apparatus.

In an optional embodiment, the apparatus further includes: a second switching module, configured to switch the second virtual game scene back to the first virtual game scene in response to the second operation being performed on the target control.

In an optional embodiment, the second switching module includes: a switching sub-module, configured to control the virtual game character to find a way to the first coordinate along the specified route in response to the second operation being performed on the target control, such that the second virtual game scene is switched back to the first virtual game scene.

In an optional embodiment, the execution module includes: a first determination module, configured to obtain the center position point in the first virtual game scene, and to determine the first coordinate based on the center position point; or a second determination module, configured to obtain the current position point of the virtual game character in the first virtual game scene, and determine the first coordinate based on the current position point.

In an optional embodiment, the apparatus further includes: a third switching module, configured to switch the second virtual game scene to a third virtual game scene in response to the third operation for scene switching.

In an optional embodiment, the apparatus further includes: an acquirisition module, configured to acquire the third coordinate of the virtual game character in the third virtual game scene; a second determination module, configured to determine whether the second distance between the third coordinate and the second coordinate is greater than the second threshold; and a fourth switching module, configured to control the target control to switch from the second function back to the first function when the second distance is greater than the second threshold.

In an optional embodiment, the target control is arranged at a predetermined position of the game scene screen. The predetermined position is further provided with at least one of the following: a thumbnail map, a search control, and a mark control. The thumbnail map is at least used to display the coordinates in the virtual game scene.

It should be noted that, for optional or preferred implementations of the present embodiment, reference may be made to the relevant descriptions in the method embodiments, which will not be repeated here.

The apparatus for processing the game scene may also include a processor and a memory. The execution module 400, the first determination module 402, the first switching module 404, and the processing module 406 are all stored in the memory as program units. The processor executes the program units stored in the memory to implement the corresponding functions.

The processor includes a kernel, and the kernel calls the corresponding program units from the memory. One or more of the above-mentioned kernels may be provided. The memory may include a non-persistent memory in a computer readable medium, a random access memory (RAM) and/or a non-volatile memory, such as read only memory (ROM) or flash memory (flash RAM). The memory includes at least one memory chip.

According to an embodiment of the present disclosure, a non-volatile storage medium is also provided. Optionally, in an embodiment, the non-volatile storage medium includes a stored program. When the program is in operation, the device where the non-volatile storage medium is located is controlled to perform the method for processing the game scene according to any one of the above-mentioned embodiments.

Optionally, in an embodiment, the non-volatile storage medium may be located in any computer terminal in the computer terminal group in the computer network, or in any mobile terminal in the mobile terminal group. The non-volatile storage medium includes stored programs.

Optionally, when the program is in operation, the device where the non-volatile storage medium is located is controlled to perform the following functions.

A graphical user interface is obtained by rendering through a display component of a terminal. The graphical user interface includes a target control and a game scene screen displaying at least part of the virtual game scene. The target control is associated with a first function or a second function.

When the target control is associated with the first function, and in response to the first operation being performed on the target control, the first coordinate of the first virtual game scene displayed by the game scene screen is acquired.

It is determined whether the first distance between the first coordinate and a second coordinate is greater than a first threshold. The second coordinate is a coordinate of the target virtual model in the virtual game scene.

When the first distance is greater than the first threshold, the first virtual game scene displayed by the game scene screen is switched to a second virtual game scene. The second virtual game scene is the virtual game scene where the second coordinate is located.

The target control is controlled to switch from the first function to the second function.

After controlling the target control to switch from the first function to the second function, the second virtual game scene is switched back to the first virtual game scene in response to a second operation being performed on the target control.

Optionally, after switching the second virtual game scene back to the first virtual game scene, the method includes: controlling the target control to switch from the second function back to the first function.

Optionally, when the first distance is greater than the first threshold, the operation of switching the first virtual game scene displayed by the game scene screen to the second virtual game scene, includes: when the first distance is greater than the first threshold, switching the first virtual game scene displayed by the game scene screen to the second virtual game scene, and recording the first coordinate.

Optionally, the method includes: when the first distance is less than or equal to the first threshold, switching the first virtual game scene displayed by the game scene screen to the second virtual game scene; and keeping the target control being associated with the first function.

Optionally, in response to the second operation being performed on the target control, the operation of switching the second virtual game scene back to the first virtual game scene, includes: in response to the second operation being performed on the target control, controlling the virtual game character to find a path to the first coordinate along a specified route, so as to complete the switch from the second virtual game scene back to the first virtual game scene.

Optionally, the operation of acquiring the first coordinate of the first virtual game scene displayed by the game scene screen, includes: acquiring a center position point in the first virtual game scene, and determining the first coordinate based on the center position point; or acquiring the current position point in the first virtual game scene, and determining the first coordinate based on the current position point.

Optionally, after switching the first virtual game scene to the second virtual game scene, the method further includes: in response to the third operation for scene switching, switching the second virtual game scene to a third virtual game scene.

Optionally, after switching the second virtual game scene to the third virtual game scene, the method further includes: acquiring a third coordinate in the third virtual game scene; determining whether the second distance between the third coordinate and the second coordinate is greater than a second threshold; and when the second distance is greater than the second threshold, controlling the target control to switch from the second function back to the first function.

Optionally, the third coordinate is the current position point of the virtual game character in the third virtual game scene, the center coordinate in the third virtual game scene, or other fixed position points in the third virtual game scene. Optionally, the method includes: when the second distance is less than or equal to the second threshold, keeping the target control being associated with the second function.

Optionally, the target control is arranged at a predetermined position of the game scene screen. The predetermined position is further provided with at least one of the following: a thumbnail map, a search control, and a mark control. The thumbnail map is at least used to display coordinates in the virtual game scene.

Optionally, when the target control is associated with the first function, the icon displayed by the target control is an icon corresponding to the first function; and when the target control is associated with the second function, the icon displayed by the target control is an icon corresponding to the second function.

According to an embodiment of the present disclosure, a processor is also provided. Optionally, in an embodiment, the processor is used to execute a program. When the program is in operation, the method for processing the game scene according to any one of the above-mentioned embodiments is performed. An embodiment of the present disclosure provides an electronic device including a memory and a processor. The memory stores a computer program, and the processor is configured to run the computer program to perform the method for processing the game scene according to any one of the above-mentioned embodiments.

The present disclosure also provides a computer program product. When executed on a data processing device, the computer program product is adapted to execute a program initialized with the following method steps.

A graphical user interface is obtained by rendering through a display component of a terminal. The graphical user interface includes a target control and a game scene screen displaying at least part of the virtual game scene. The target control is associated with the first function or the second function.

When the target control is associated with the first function, and in response to the first operation being performed on the target control, the first coordinate of the first virtual game scene displayed on the game scene screen is acquired.

It is determined whether the first distance between the first coordinate and the second coordinate is greater than a first threshold. The second coordinate is the coordinate of the target virtual model in the virtual game scene.

When the first distance is greater than the first threshold, the first virtual game scene displayed on the game scene screen is switched to a second virtual game scene. The second virtual game scene is the virtual game scene where the second coordinate is located.

The target control is controlled to switch from the first function to the second function.

After controlling the target control to switch from the first function to the second function, the second virtual game scene is switched back to the first virtual game scene in response to the second operation being performed on the target control.

Optionally, after switching the second virtual game scene back to the first virtual game scene, the method includes: controlling the target control to switch from the second function back to the first function.

Optionally, when the first distance is greater than the first threshold, the operation of switching the first virtual game scene displayed on the game scene screen to the second virtual game scene includes: when the first distance is greater than the first threshold, switching the first virtual game scene displayed on the game scene screen to the second virtual game scene, and recording the first coordinate.

Optionally, the method includes: when the first distance is less than or equal to the first threshold, switching the first virtual game scene displayed on the game scene screen to the second virtual game scene; and keeping the target control being associated with the first function.

Optionally, in response to the second operation being performed on the target control, switching the second virtual game scene back to the first virtual game scene, includes: in response to the second operation being performed on the target control, controlling the virtual game character to find a path to the first coordinate along a specified route, so as to complete the switch from the second virtual game scene back to the first virtual game scene.

Optionally, the operation of acquiring the first coordinate of the first virtual game scene displayed on the game scene screen includes: acquiring a center position point in the first virtual game scene, and determining the first coordinate based on the center position point; or acquiring the current position point in the first virtual game scene, and determining the first coordinate based on the current position point.

Optionally, after switching the first virtual game scene to the second virtual game scene, the method further includes: in response to the third operation for scene switching, switching the second virtual game scene to a third virtual game scene.

Optionally, after switching the second virtual game scene to the third virtual game scene, the method further includes: acquiring a third coordinate in the third virtual game scene; determining whether the second distance between the third coordinate and the second coordinate is greater than a second threshold; and when the second distance is greater than the second threshold, controlling the target control to switch from the second function back to the first function.

Optionally, the third coordinate is the current position point of the virtual game character in the third virtual game scene, the center coordinate in the third virtual game scene, or other fixed position points in the third virtual game scene.

Optionally, the method includes: when the second distance is less than or equal to the second threshold, keeping the target control being associated with a second function.

Optionally, the target control is arranged at a predetermined position of the game scene screen. The predetermined position is further provided with at least one of the following: a thumbnail map, a search control, and a mark control. The thumbnail map is at least used to display coordinates in the virtual game scene.

Optionally, when the target control is associated with the first function, the icon displayed by the target control is an icon corresponding to the first function; and when the target control is associated with the second function, the icon displayed by the target control is an icon corresponding to the second function.

The above-mentioned serial numbers for embodiments of the present disclosure are only for description, and do not represent any advantages or disadvantages of these embodiments.

In the above-mentioned embodiments of the present disclosure, the description of each embodiment has its own emphasis. For parts that are not described in detail in a certain embodiment, reference may be made to related descriptions in other embodiments.

In several embodiments provided by the present disclosure, it should be understood that the disclosed technical contents may be implemented in other ways. The apparatus embodiments described above are only illustrative. For example, the division of the described units may be a logical function division. In actual implementations, there may be other divisions. For example, multiple units or components may be combined or may be integrated into another system, or some features may be ignored, or may not be implemented. On the other hand, the shown or discussed mutual coupling or direct coupling or communication connection may be achieved through some interface, indirect coupling or communication connection among units or modules, and may also be in electrical or other forms.

The units described as separate components may or may not be physically separated. The components shown as a unit may or may not be a physical unit. That is, they may be located in one place, or may be distributed among multiple units. Some or all of the units may be selected according to actual needs to achieve the purpose of the solution in an embodiment.

In addition, each functional unit in each embodiment of the present disclosure may be integrated into one processing unit, or each unit may exist physically alone. Alternatively, two or more units may be integrated into one unit. The above-mentioned integrated units may be implemented in the form of hardware, or may be implemented in the form of software functional units.

The integrated unit, if implemented in the form of a software functional unit and sold or used as an independent product, may be stored in a computer-readable non-volatile storage medium. Based on this understanding, the technical solutions of the present disclosure, or the part that contributes to the related technology thereof, or the whole or part of the technical solutions, may be embodied in the form of software products in essence. The computer software product is stored in a non-volatile storage medium, which includes several instructions for causing a computer device (which may be a personal computer, a server, or a network device, etc.) to execute all or part of the steps of the methods described in various embodiments of the present disclosure. The aforementioned non-volatile storage media include U disk, Read-Only Memory (ROM, Random Access Memory (RAM), removable hard disk, magnetic disk or optical disk, and other various storage media for program codes.

The above are only preferred embodiments of the present disclosure. It should be pointed out that for those skilled in the art, without departing from the principle of the present disclosure, several improvements and modifications may be made. It should be regarded as the protection scope of the present disclosure.

The invention claimed is:

1. A method for processing a game scene, wherein a graphical user interface is rendered by a display component of a terminal, the graphical user interface comprises a target control and a game scene screen displaying at least part of a virtual game scene, and the target control is associated with a first function or a second function, the method comprising:
   in response to the target control being associated with the first function and a first operation being performed on the target control, acquiring a first coordinate of a first virtual game scene displayed by the game scene screen;
   determining whether a first distance between the first coordinate and a second coordinate is greater than a first threshold, wherein the second coordinate is a coordinate of a target virtual model in the virtual game scene;

in response to the first distance being greater than the first threshold, switching the first virtual game scene displayed by the game scene screen to a second virtual game scene, wherein the second virtual game scene is a virtual game scene where the second coordinate is located;

controlling the target control to switch from the first function to the second function; and after controlling the target control to switch from the first function to the second function, and in response to a second operation being performed on the target control, switching the second virtual game scene back to the first virtual game scene.

2. The method according to claim 1, wherein after switching the second virtual game scene back to the first virtual game scene, the method comprises:

controlling the target control to switch from the second function back to the first function.

3. The method according to claim 1, wherein in response to the first distance being greater than the first threshold, switching the first virtual game scene displayed by the game scene screen to the second virtual game scene, comprises:

in response to the first distance being greater than the first threshold, switching the first virtual game scene displayed by the game scene screen to the second virtual game scene, and recording the first coordinate.

4. The method according to claim 1, wherein the method comprises:

in response to the first distance being less than or equal to the first threshold, switching the first virtual game scene displayed by the game scene screen to the second virtual game scene, and keeping the target control being associated with the first function.

5. The method according to claim 1, wherein in response to the second operation being performed on the target control, switching the second virtual game scene back to the first virtual game scene, comprises:

in response to the second operation being performed on the target control, controlling a virtual game character to find a path to the first coordinate along a designated route, such that the second virtual game scene is switched back to the first virtual game scene.

6. The method according to claim 1, wherein acquiring the first coordinate of the first virtual game scene displayed by the game scene screen, comprises:

acquiring a center position point in the first virtual game scene, and determining the first coordinate based on the center position point; or acquiring a current position point of a virtual game character in the first virtual game scene, and determining the first coordinate based on the current position point.

7. The method according to claim 1, wherein after switching the first virtual game scene to the second virtual game scene, the method further comprises:

in response to a third operation for scene switching, switching the second virtual game scene to a third virtual game scene.

8. The method according to claim 7, wherein after switching the second virtual game scene to the third virtual game scene, the method further comprises:

acquiring a third coordinate in the third virtual game scene;

determining whether a second distance between the third coordinate and the second coordinate is greater than a second threshold; and in response to the second distance being greater than the second threshold, controlling the target control to switch from the second function back to the first function.

9. The method according to claim 8, wherein the third coordinate is a current position point of a virtual game character in the third virtual game scene, or a center coordinate in the third virtual game scene, or another fixed position point in the third virtual game scene.

10. The method according to claim 8, wherein the method comprises:

in response to the second distance being less than or equal to the second threshold, keeping the target control being associated with the second function.

11. The method according to claim 1, wherein the target control is arranged at a predetermined position of the game scene screen, the predetermined position is further provided with at least one of a thumbnail map, a search control, and a marker control, and the thumbnail map is at least configured to display coordinates in the virtual game scene.

12. The method according to claim 1, wherein in response to the target control is associated with the first function, an icon displayed by the target control is an icon corresponding to the first function; and in response to the target control is associated with the second function, an icon displayed by the target control is an icon corresponding to the second function.

13. A non-volatile storage medium, configured to store a program therein, wherein when the program is in operation, a device where the non-volatile storage medium is located is controlled to perform the method for processing a game scene, wherein a graphical user interface is rendered by a display component of a terminal, the graphical user interface comprises a target control and a game scene screen displaying at least part of a virtual game scene, and the target control is associated with a first function or a second function; and the method comprises:

in response to the target control being associated with the first function and a first operation being performed on the target control, acquiring a first coordinate of a first virtual game scene displayed by the game scene screen;

determining whether a first distance between the first coordinate and a second coordinate is greater than a first threshold, wherein the second coordinate is a coordinate of a target virtual model in the virtual game scene;

in response to the first distance being greater than the first threshold, switching the first virtual game scene displayed by the game scene screen to a second virtual game scene, wherein the second virtual game scene is a virtual game scene where the second coordinate is located;

controlling the target control to switch from the first function to the second function; and after controlling the target control to switch from the first function to the second function, and in response to a second operation being performed on the target control, switching the second virtual game scene back to the first virtual game scene.

14. An electronic device, comprising a memory and a processor, wherein the memory is configured to store a computer program therein, and the processor is configured to execute the computer program to perform the method for processing a game scene, wherein
   a graphical user interface is rendered by a display component of a terminal, the graphical user interface comprises a target control and a game scene screen displaying at least part of a virtual game scene, and the target control is associated with a first function or a second function; and
   the method comprises:
   in response to the target control being associated with the first function and a first operation being performed on the target control, acquiring a first coordinate of a first virtual game scene displayed by the game scene screen;
   determining whether a first distance between the first coordinate and a second coordinate is greater than a first threshold, wherein the second coordinate is a coordinate of a target virtual model in the virtual game scene;
   in response to the first distance being greater than the first threshold, switching the first virtual game scene displayed by the game scene screen to a second virtual game scene, wherein the second virtual game scene is a virtual game scene where the second coordinate is located;
   controlling the target control to switch from the first function to the second function; and
   after controlling the target control to switch from the first function to the second function, and in response to a second operation being performed on the target control, switching the second virtual game scene back to the first virtual game scene.

15. The electronic device according to claim 14, wherein in response to the first distance being greater than the first threshold, switching the first virtual game scene displayed by the game scene screen to the second virtual game scene, comprises:
   in response to the first distance being greater than the first threshold, switching the first virtual game scene displayed by the game scene screen to the second virtual game scene, and recording the first coordinate.

16. The electronic device according to claim 14, wherein the method comprises:
   in response to the first distance being less than or equal to the first threshold, switching the first virtual game scene displayed by the game scene screen to the second virtual game scene; and
   keeping the target control being associated with the first function.

17. The electronic device according to claim 14, wherein acquiring the first coordinate of the first virtual game scene displayed by the game scene screen, comprises:
   acquiring a center position point in the first virtual game scene, and determining the first coordinate based on the center position point; or
   acquiring a current position point of a virtual game character in the first virtual game scene, and determining the first coordinate based on the current position point.

18. The electronic device according to claim 14, wherein after switching the first virtual game scene to the second virtual game scene, the method further comprises:
   in response to a third operation for scene switching, switching the second virtual game scene to a third virtual game scene.

19. The electronic device according to claim 18, wherein after switching the second virtual game scene to the third virtual game scene, the method further comprises:
   acquiring a third coordinate in the third virtual game scene;
   determining whether a second distance between the third coordinate and the second coordinate is greater than a second threshold; and
   in response to the second distance being greater than the second threshold, controlling the target control to switch from the second function back to the first function.

20. The electronic device according to claim 19, wherein the method comprises:
   in response to the second distance being less than or equal to the second threshold, keeping the target control being associated with the second function.

* * * * *